(12) United States Patent
Lee et al.

(10) Patent No.: US 9,952,362 B2
(45) Date of Patent: Apr. 24, 2018

(54) POLARIZING PLATE AND DISPLAY APPARATUS COMPRISING SAME

(71) Applicant: LG CHEM, LTD., Seoul (KR)

(72) Inventors: Mi Rin Lee, Daejeon (KR); Kwang Seung Park, Daejeon (KR); Eunsoo Huh, Daejeon (KR); Jun Wuk Park, Daejeon (KR); Sung Hyun Jeon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/507,593

(22) PCT Filed: Sep. 25, 2015

(86) PCT No.: PCT/KR2015/010206
§ 371 (c)(1),
(2) Date: Feb. 28, 2017

(87) PCT Pub. No.: WO2016/052952
PCT Pub. Date: Apr. 7, 2016

(65) Prior Publication Data
US 2017/0285233 A1 Oct. 5, 2017

(30) Foreign Application Priority Data
Sep. 30, 2014 (KR) .................. 10-2014-0132036

(51) Int. Cl.
*G02B 5/30* (2006.01)
*G02F 1/1335* (2006.01)
*C09J 4/00* (2006.01)

(52) U.S. Cl.
CPC ............. *G02B 5/30* (2013.01); *G02F 1/1335* (2013.01); *C09J 4/00* (2013.01)

(58) Field of Classification Search
CPC .. G02B 5/30; G02F 1/1335; C09J 4/00; C09J 4/02; C09J 7/02; C09J 123/08; C09J 133/04; C08K 5/09; B32B 7/12

USPC ........................................ 359/483.01; 349/96
See application file for complete search history.

(56) References Cited

U.S. PATENT DOCUMENTS

| 8,722,182 | B2 * | 5/2014 | Akari ................... G02B 5/3033 359/483.01 |
| 9,829,605 | B2 * | 11/2017 | Takeda ..................... G02B 1/14 |
| 2008/0252973 | A1 * | 10/2008 | Akari ................... G02B 5/3033 359/485.01 |
| 2009/0086318 | A1 * | 4/2009 | Yaegashi ................. B32B 37/12 359/485.01 |
| 2009/0087629 | A1 | 4/2009 | Everaerts et al. |
| 2009/0185271 | A1 * | 7/2009 | Yaegashi ............ B29D 11/0073 359/489.2 |
| 2010/0086705 | A1 | 4/2010 | Everaerts et al. |
| 2011/0043733 | A1 * | 2/2011 | Suzuki ................... C09J 135/04 349/96 |
| 2011/0043737 | A1 * | 2/2011 | Kim ........................ C08L 33/08 349/122 |
| 2011/0123800 | A1 | 5/2011 | Sherman et al. |
| 2012/0121824 | A1 * | 5/2012 | Toyama ............. C08G 18/4866 428/1.52 |
| 2014/0320770 | A1 | 10/2014 | Motohashi et al. |
| 2015/0049380 | A1 * | 2/2015 | Takeda ..................... G02B 5/30 359/352 |
| 2015/0099127 | A1 | 4/2015 | Ogawa et al. |
| 2015/0184031 | A1 * | 7/2015 | Yurt .......................... C09J 4/06 428/339 |
| 2016/0245959 | A1 * | 8/2016 | Huh ........................ G02B 1/14 |

FOREIGN PATENT DOCUMENTS

| KR | 10-2010-0074232 A | 7/2010 |
| KR | 10-2013-0103290 A | 9/2013 |
| KR | 10-2014-0111283 A | 9/2014 |
| WO | 2009/085662 A2 | 7/2009 |

* cited by examiner

*Primary Examiner* — Frank Font
(74) *Attorney, Agent, or Firm* — Dentons US LLP

(57) ABSTRACT

The present specification relates to a polarizing plate and a display device comprising the same.

15 Claims, No Drawings

POLARIZING PLATE AND DISPLAY APPARATUS COMPRISING SAME

TECHNICAL FIELD

This application is a National Stage Entry of International Application No. PCT/KR2015/010206, filed Sep. 25, 2015, and claims the benefit of and priority to Korean Application No. 10-2014-0132036, filed on Sep. 30, 2014, all of which are hereby incorporated by reference in their entirety for all purposes as if fully set forth herein.

The present specification relates to a polarizing plate and a display device comprising the same.

BACKGROUND ART

A polarizing plate has been generally used in a structure in which a protective film is laminated on one surface or both surfaces of a polarizer using an adhesive, the polarizer being formed of a polyvinyl alcohol (hereinafter, referred to as 'PVA')-based resin dyed with a dichroic dye or iodine for durability and water resistance. In this case, as an adhesive used to attach the polarizer to the protective film, a water-based adhesive composed of an aqueous solution of a polyvinyl alcohol-based resin is usually used. However, the water-based adhesive has a problem in that the adhesive strength deteriorates depending on the type of film material, and methods of using a non-water-based adhesive have been proposed in order to overcome the problem. Meanwhile, the non-water-based adhesives may be divided into a radical curable adhesive and a cationic curable adhesive depending on the curing method. The cationic curable adhesive has an advantage in that the adhesive has excellent adhesive strength for films formed of various materials, but has many disadvantages of manufacturing processes due to a slow curing rate and a low degree of curing.

As described above, in the case of a curable adhesive composition used in an adhesive composition, a radical curable composition may be commonly used. The radical curable composition is a very useful material due to convenient workability and fast curability in the manufacturing process of a polarizing plate.

However, the existing radical curable adhesive composition for a polarizing plate is required to have high heat resistance and elastic strength because cracks are generated on a PVA polarizer due to structural characteristics of the polarizing plate when thermal shock is evaluated. In general, in order to increase elastic strength of the adhesive composition, a polymer constituting the composition needs to be crystallized or have a high degree of crosslinking, and the degree of crosslinking of the composition has been increased by using a multifunctional acrylate-based compound such as trimethylolpropane triacrylate (TMPTA), pentaerythritol triacrylate (PETA), and dipentaerythritol hexaacrylate (DPHA) as an actual method. However, when the multifunctional acrylate is recklessly used, there is generated a problem in that as a curing shrinkage ratio is increased, adhesive strength with a PVA polarizer significantly deteriorates.

Therefore, in order to solve the problems as described above, there is an urgent need for developing a radical curable adhesive composition having excellent adhesive strength while having high elastic strength.

DETAILED DESCRIPTION OF THE INVENTION

Technical Problem

The present specification has been made in an effort to solve the aforementioned problems, and provides a polarizing plate including a cured product of a radical curable adhesive composition, which has excellent adhesive strength, as an adhesive layer between a polarizer and an acrylic protective film while having high elastic strength after UV curing, and a display device comprising the same.

Technical Solution

An exemplary embodiment of the present specification provides a polarizing plate comprising: a polarizer; an adhesive layer formed on at least one surface of the polarizer; and a protective film formed on the adhesive layer, in which the adhesive layer is a cured product of a radical curable adhesive composition comprising: (A) a first compound represented by the following [Formula 1]; (B) a second compound represented by the following Formula B; and (C) a radical initiator.

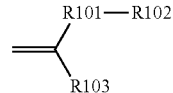
[Formula 1]

In Formula 1,

R101 is an ester group; or an ether group,

R102 is a $C_1$ to $C_{10}$ alkyl group having at least one hydroxy group (—OH); or a $C_4$ to $C_{10}$ cycloalkyl group having at least one hydroxy group (—OH), R103 is hydrogen; or a $C_1$ to $C_{10}$ alkyl group,

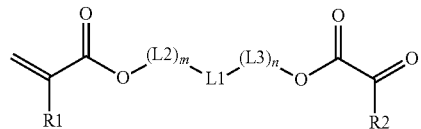
[Formula B]

In Formula B, at least one of R1 and R2 is hydrogen, and the other is a $C_1$ to $C_{10}$ alkyl group, L1 is —N(H)C(═O)N(H)—; or —N(H)C(═O)-L4-C(═O)N(H)—, L2 to L4 are the same as or different from each other, and are each independently a $C_1$ to $C_{10}$ alkylene group, which is unsubstituted or substituted with an alkyl group, when L2 and L3 are the same as or different from each other, and are each independently a $C_1$ to $C_{10}$ unsubstituted alkylene group, one of R1 and R2 is a $C_1$ to $C_{10}$ alkyl group, m and n are each 1 or 2, and when m and n are each 2, two structures in the parenthesis are the same as or different from each other.

Further, another exemplary embodiment of the present specification provides a display device comprising: a display panel; and the above-described polarizing plate provided on one surface or both surfaces of the display panel.

Advantageous Effects

The radical curable adhesive compound according to an exemplary embodiment of the present specification has high elastic strength after UV curing, and has a high glass transition temperature, and thus has excellent water resistance and heat resistance.

Further, the radical curable adhesive composition according to an exemplary embodiment of the present specification is advantageous in that adhesive strength between a polarizer and a protective film is excellent.

BEST MODE

Hereinafter, preferred exemplary embodiments of the present specification will be described. However, the exemplary embodiments of the present specification may be modified into various other forms, and the scope of the present specification is not limited to the exemplary embodiments which will be described below. Further, the exemplary embodiments of the present specification are provided to more fully explain the present invention to a person with ordinary skill in the art.

The term "substitution" means that a hydrogen atom bonded to a carbon atom of a compound is changed into another substituent, and a position to be substituted is not limited as long as the position is a position at which the hydrogen atom is substituted, that is, a position at which the substituent may be substituted, and when two or more substituents are substituted, the two or more substituents may be the same as or different from each other.

In the present specification, the alkyl group may be straight-chained or branched, and the number of carbon atoms thereof is not particularly limited, but is preferably 1 to 30. Specific examples thereof include methyl, ethyl, propyl, n-propyl, isopropyl, butyl, n-butyl, isobutyl, tert-butyl, sec-butyl, 1-methyl-butyl, 1-ethylbutyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cyclohexylmethyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylpentyl, 4-methylhexyl, 5-methylhexyl, and the like, but are not limited thereto.

In the present specification, the alkylene group means that there are two bonding positions in an alkyl group, that is, a divalent group. The above-described description on the alkyl group may be applied, except that the alkylene groups are each a divalent group.

According to an exemplary embodiment of the present specification, in Formula 1, $R_1$ is an ester group; or an ether group, $R_2$ is a $C_1$ to $C_{10}$ alkyl group having at least one hydroxy group (—OH); or a $C_4$ to $C_{10}$ cycloalkyl group having at least one hydroxy group (—OH), and $R_3$ is hydrogen; or a $C_1$ to $C_{10}$ alkyl group. In this case, in $R_2$, the alkyl group may be a straight-chained or branched alkyl, and the hydroxy group (—OH) may be substituted at any position in an alkyl group; or a cycloalkyl group. That is, the hydroxy group may also be at the end of an alkyl group, and may also be in the middle of an alkyl group.

The first compound is a component for implementing the adhesive strength of a radical curable adhesive compound, and various compounds represented by Formula 1 may be used. For example, in the present specification, the first compound may be one or more compounds selected from the group consisting of compounds represented by the following Formula 2 to Formula 9, but is not limited thereto.

[Formula 2]

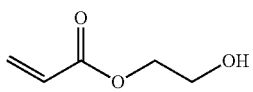

[Formula 3]

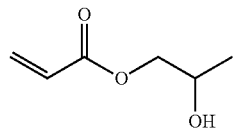

[Formula 4]

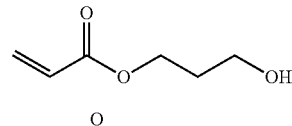

[Formula 5]

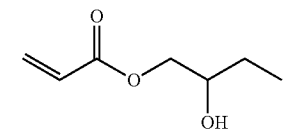

[Formula 6]

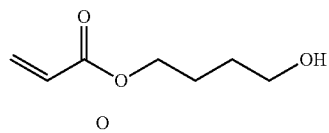

[Formula 7]

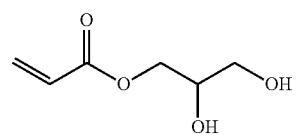

[Formula 8]

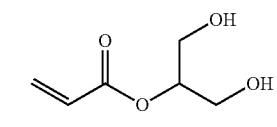

[Formula 9]

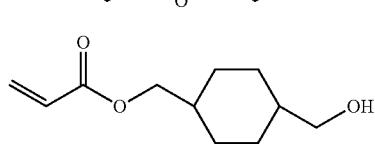

Meanwhile, the content of the first compound may be 40 to 85 parts by weight, 50 to 80 parts by weight, or 60 to 70 parts by weight, based on 100 parts by weight of the entire radical curable adhesive composition. When the content of the first compound satisfies the numerical range, it is possible to secure a stable adhesive strength even under high humid circumstances.

According to an exemplary embodiment of the present specification, the second compound is represented by Formula B.

According to an exemplary embodiment of the present specification, in Formula B, at least one of R1 and R2 is hydrogen, and the other is a methyl group.

According to an exemplary embodiment of the present specification, in Formula B, R1 and R2 are hydrogen.

According to an exemplary embodiment of the present specification, in Formula B, R1 is hydrogen, and R2 is a methyl group.

According to an exemplary embodiment of the present specification, in Formula B, R2 is hydrogen, and R1 is a methyl group.

According to an exemplary embodiment of the present specification, in Formula B, L1 is —N(H)C(=O)N(H)—.

According to an exemplary embodiment of the present specification, in Formula B, L2 and L3 are the same as or different from each other, and are each independently a $C_1$ to $C_{10}$ alkylene group, which is unsubstituted or substituted with a methyl group.

According to an exemplary embodiment of the present specification, in Formula B, L2 and L3 are the same as or different from each other, and are each independently an ethylene group; or an ethylene group substituted with a methyl group.

According to an exemplary embodiment of the present specification, in Formula B, L2 and L3 are an ethylene group.

According to an exemplary embodiment of the present specification, in Formula B, L2 is an ethylene group, and L3 is an ethylene group substituted with a methyl group.

According to an exemplary embodiment of the present specification, in Formula B, L3 is an ethylene group, and L2 is an ethylene group substituted with a methyl group.

According to an exemplary embodiment of the present specification, in Formula B, when L2 and L3 are the same as or different from each other, and are each independently an unsubstituted $C_1$ to $C_{10}$ alkylene group, one of R1 and R2 is a $C_1$ to $C_{10}$ alkyl group.

According to an exemplary embodiment of the present specification, in Formula B, when L2 and L3 are the same as or different from each other, and are each independently an unsubstituted ethylene group, one of R1 and R2 is a methyl group.

According to an exemplary embodiment of the present specification, the second compound is for improving a storage modulus and heat resistance of the radical curable adhesive composition, and is preferably obtained by reacting an aziridine compound; and (meth)acrylic acid or a (meth) acrylate including a hydroxy group (—OH) as a substituent. The second compound has a structure formed by a ring-opening reaction between an aziridine compound and (meth) acrylic acid or an alcohol group.

In this case, the second compound serves to increase the degree of crosslinking because an amine group produced by a reaction between aziridine and (meth)acrylic acid or a hydroxy group (—OH) forms a hydrogen bond with a polarizer, and further, the amine group is flexible and thus may improve a storage modulus and simultaneously alleviate a curing shrinkage ratio generated when a multifunctional acrylate is cured, so that it is possible to effectively prevent the adhesive strength from deteriorating and improve thermal shock stability.

The aziridine compound is a compound including at least one aziridine group, and the number of aziridine groups or the structure and number of substituents attached to the aziridine groups are not limited, but for example, the aziridine compound is represented by the following Formula 10 or 11.

[Formula 10]
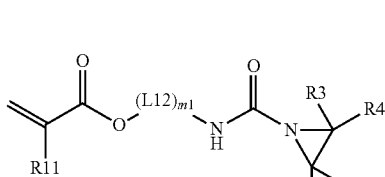

[Formula 11]
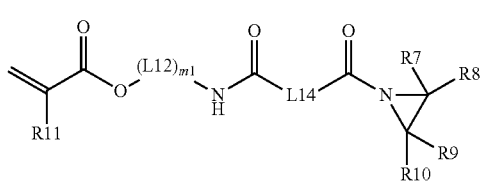

In Formulae 10 and 11,

R3 to R11 are the same as or different from each other, and are each independently hydrogen; or a $C_1$ to $C_{10}$ alkyl group, L12 and L14 are the same as or different from each other, and are each independently a $C_1$ to $C_{10}$ alkylene group, which is unsubstituted or substituted with an alkyl group, m1 is 1 or 2, and when m1 is 2, two L12's are the same as or different from each other.

In the present specification, (meth)acrylic acid means acrylic acid or methacrylic acid.

In the present specification, (meth)acrylate means acrylate or methacrylate.

According to an exemplary embodiment of the present specification, the (meth)acrylate including a hydroxy group (—OH) as a substituent is represented by the following Formula 12.

[Formula 12]
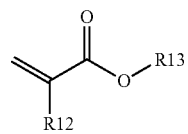

In Formula 12,

R12 is hydrogen; or a $C_1$ to $C_{10}$ alkyl group,

R13 is a $C_1$ to $C_{10}$ alkyl group, which is substituted with at least one hydroxy group (—OH); or a $C_{3\ to\ 10}$ cycloalkyl group, which is substituted with at least one hydroxy group (—OH).

In the present specification, the cycloalkyl group is not particularly limited, but the number of carbon atoms thereof is preferably 3 to 30, and specific examples thereof include cyclopropyl, cyclobutyl, cyclopentyl, 3-methylcyclopentyl, 2,3-dimethylcyclopentyl, cyclohexyl, 3-methylcyclohexyl, 4-methylcyclohexyl, 2,3-dimethylcyclohexyl, 3,4,5-trimethylcyclohexyl, 4-tert-butylcyclohexyl, cycloheptyl, cyclooctyl, and the like, but are not limited thereto.

According to an exemplary embodiment of the present specification, the second compound represented by Formula B is represented by the following Formula B-1 or B-2.

[Formula B-1]
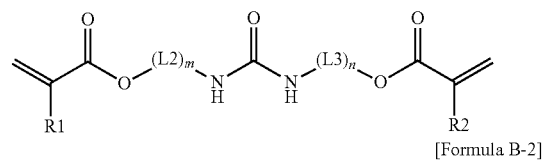

[Formula B-2]
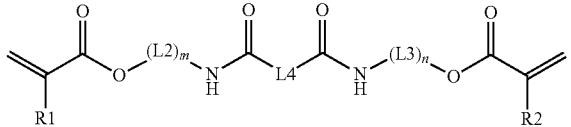

In Formulae B-1 and B-2, the definitions of R1, R2, L2 to L4, m, and n are the same as those of Formula 1.

According to an exemplary embodiment of the present specification, the second compound represented by Formula B is represented by the following Formula B-3 to B-5.

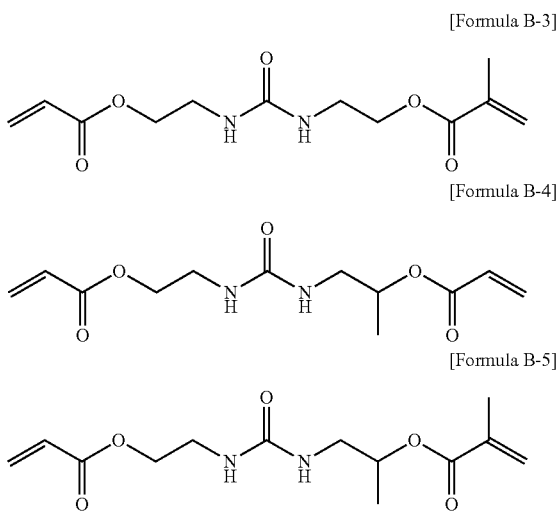

[Formula B-3]
[Formula B-4]
[Formula B-5]

The second compound represented by Formula B increases a glass transition temperature and a storage elastic modulus because an amine group (—NH—) positioned in the middle of the chain of the compound forms a hydrogen bond with an amine group (—NH—) formed at the chain of another compound and thus strengthens the bonding between polymer chains.

Meanwhile, the content of the second compound is preferably, for example, approximately 5 to 50 parts by weight, and may be, for example, approximately 10 to 40 parts by weight or 20 to 30 parts by weight, based on 100 parts by weight of the radical curable adhesive composition. When the content of the second compound satisfies the range, sufficient thermal shock stability is secured, and an appropriate glass transition temperature and an appropriate curing shrinkage ratio are maintained, and thus, adhesive strength is also excellent.

According to an exemplary embodiment of the present specification, between an aziridine compound; and (meth) acrylic acid or a (meth)acrylate including a hydroxy group as a substituent, which form the second compound, when the number of aziridine groups of the aziridine compound is defined as n, it is preferred that the molar ratio of the aziridine compound:(meth)acrylic acid or the (meth)acrylate including a hydroxy group as a substituent is 1:n, and n is an integer.

That is, it is preferred that for the second compound, all the aziridine groups, which is present at the ends of the aziridine compound that is a reactant, are reacted with (meth)acrylic acid and an alcohol group. This is because when an aziridine group is left in the second compound produced, properties such as a glass transition temperature may deteriorate.

More specifically, the molar ratio of the aziridine compound represented by Formula B-1 or B-2 to (meth)acrylic acid or the (meth)acrylate represented by Formula 12, which includes a hydroxy group (—OH) as a substituent, is preferably 1:1.

According to an exemplary embodiment of the present specification, the radical curable adhesive composition may additionally include an acrylic monomer including an amine group as a third compound in order to implement low viscosity and improve adhesive strength.

More specifically, the third compound may be, for example, one or more selected from the group consisting of N,N-dimethyl acrylamide, acryloyl morpholine, N-isopropyl acrylamide, N,N-diethyl acrylamide, N,N-dimethylamino propylacrylamide, and 1,2,2,6,6-pentamethyl-4-piperidiyl methacrylate, but is not limited thereto.

Meanwhile, the content of the third compound is preferably, for example, 5 to 20 parts by weight, 5 to 15 parts by weight, or 10 to 15 parts by weight, based on 100 parts by weight of the radical curable adhesive composition. This is because when the content of the third compound satisfies the range, all of the adhesive strength, viscosity, and glass transition temperature are excellent.

More specifically, it is preferred that the radical curable adhesive composition of the present specification includes 40 to 85 parts by weight of the first compound, 5 to 50 parts by weight of the second compound, 5 to 20 parts by weight of the third compound, and 0.1 to 10 parts by weight of the radical initiator, based on 100 parts by weight of the entire curable composition.

The radical initiator included in the radical curable adhesive composition according to an exemplary embodiment of the present specification is for improving the curing rate by promoting the radical polymerizability. In this case, radical initiators generally used in the art may be used without limitation as the radical initiator, and the radical initiator may be, for example, one or more selected from the group consisting of 1-hydroxy-cyclohexyl-phenyl-ketone, 2-hydroxy-2-methyl-1-phenyl-1-propanone, 2-hydroxy-1-[4-(2-hydroxyethoxy) phenyl]-2-methyl-1-propanone, methylbenzoylformate, oxy-phenyl-acetic acid-2-[2-oxo-2-phenyl-acetoxy-ethoxy]-ethyl ester, oxy-phenyl-acetic acid-2-[2-hydroxy-ethoxy]-ethyl ester, alpha-dimethoxy-alpha-phenylacetophenone, 2-benzyl-2-(dimethylamino)-1-[4-(4-morpholinyl)phenyl]-1-butanone, 2-methyl-1-[4-(methylthio)phenyl]-2-(4-morpholinyl)-1-propanone, diphenyl (2,4,6-trimethylbenzoyl)-phosphine oxide, phosphine oxide, and phenylbis(2,4,6-trimethylbenzoyl)-phosphineoxide. In particular, in the present invention, phenylbis (2,4,6-trimethylbenzoyl)-phosphineoxide may be preferably used. Meanwhile, it is preferred that the content of the radical initiator is, for example, 0.5 to 10 parts by weight, 1 to 5 parts by weight or 2 to 3 parts by weight, based on 100 parts by weight of the radical curable adhesive composition. This is because when the content of the radical initiator satisfies the numerical range, the composition may be smoothly cured.

It is preferred that the radical curable adhesive composition according to an exemplary embodiment of the present specification has a glass transition temperature of approximately 60° C. to 500° C. after curing, and the glass transition temperature may be, for example, 90° C. to 300° C. or 80° C. to 200° C. A polarizing plate including, as the adhesive layer, a cured product of the radical curable adhesive composition according to the present invention that has the glass transition temperature in the aforementioned numerical range, is advantageous in that heat resistance and water resistance are excellent.

In the present specification, the curing means that the radical curable adhesive composition is cured by 80% or more by UV rays.

Furthermore, the radical curable adhesive composition according to an exemplary embodiment of the present specification has a storage modulus of 1,000 MPa to 5,000 MPa, which is measured by a dynamic mechanical analysis (DMA) method at 25° C. after curing, and the storage modulus is preferably approximately 2,000 MPa to 4,000

MPa. When the storage modulus of the composition satisfies the range, excellent characteristics are exhibited in thermal shock stability.

Meanwhile, the adhesive layer, which is a cured product of the radical curable adhesive composition according to an exemplary embodiment of the present specification, may be used as an adhesive layer which adheres a polarizer to a protective film, or forms a protective film on at least one surface of the polarizer.

In this case, it is preferred that the radical curable adhesive composition according to the present specification has a viscosity of approximately 10 to 300 cP or 20 to 100 cP. When the viscosity of the composition satisfies the numerical range, there is an advantage in that the workability is excellent because the adhesive layer may be thinly formed in a polarizing plate, and the composition has low viscosity.

In the present specification, the polarizer is not particularly limited, and a polarizer well-known in the art, for example, a film composed of polyvinyl alcohol (PVA) including iodine or a dichroic dye may be used. The polarizer may be manufactured by dyeing iodine or a dichroic dye on a PVA film, but the manufacturing method thereof is not particularly limited. In the present specification, the polarizer means a state in which a protective film is not included, and the polarizing plate means a state in which a polarizer and a protective film are included.

Next, the adhesive layer is formed by using the above-described radical curable adhesive composition according to the present invention, and may be formed by a method well-known in the art. For example, the method may be performed by applying the radical curable adhesive composition on one surface of a protective film to form an adhesive layer, laminating a polarizer and the protective film, and then curing the composition by irradiating an active energy ray.

Meanwhile, as the protective film formed on the adhesive, it is possible to use protective films of various materials generally known in the art, for example, a cellulose-based film, a polyethylene terephthalate (PET) film, a cycloolefin polymer (COP) film, an acrylic film, and the like without limitation. Among them, it is particularly preferred to use an acrylic film in consideration of optical characteristics, durability, economic feasibility, and the like, and the acrylic film may contain a (meth)acrylate-based resin. The film including a (meth)acrylate-based resin may be obtained by molding, for example, a molding material containing a (meth)acrylate-based resin as a main component by extrusion molding.

The acrylic protective film may be a film including a copolymer including an alkyl(meth)acrylate-based unit and a styrene-based unit, and an aromatic resin having a carbonate portion in the main chain, or a film including an alkyl(meth)acrylate-based unit, a styrene-based unit, a 3- to 5-membered heterocyclic unit substituted with at least one carbonyl group, and a vinyl cyanide unit.

Alternatively, the acrylic protective film may be a film including a (meth)acrylate-based resin having an aromatic ring. Examples of the (meth)acrylate-based resin having an aromatic ring include a resin composition described in Korean Patent Application Laid-Open No. 10-2009-0115040, the resin composition comprising: (a) a (meth)acrylate-based unit including one or more (meth)acrylate-based derivatives; (b) an aromatic unit having a chain with a hydroxy group-containing portion and an aromatic portion; and (c) a styrene-based unit including one or more styrene-based derivatives. The units of (a) to (c) may also be each included in the form of a separate copolymer in the resin composition, and two or more units among the units of (a) to (c) may also be included in the form of one copolymer in the resin composition.

Alternatively, the acrylic protective film may be a film including an acrylic resin having a lactone ring structure. Specific examples of the (meth)acrylate-based resin having a lactone ring structure include (meth)acrylate-based resins having a lactone ring structure, which are described in, for example, the official gazettes of Japanese Patent Application Laid-Open No. 2000-230016, Japanese Patent Application Laid-Open No. 2001-151814, Japanese Patent Application Laid-Open No. 2002-120326, and the like.

The method of preparing the acrylic protective film is not particularly limited, and for example, the acrylic protective film may be prepared by sufficiently mixing a (meth)acrylate-based resin, other polymers, additives, and the like by any appropriate mixing method to prepare a thermoplastic resin composition, and then film-molding the thermoplastic resin composition, or by preparing a (meth)acrylate-based resin, other polymers, additives, and the like as a separate solution, mixing the mixture to form a uniform mixture solution, and then film-molding the mixture.

The thermoplastic resin composition is, for example, prepared by pre-blending the film raw material by using any appropriate mixer such as an omni-mixer, and then extrusion-kneading the obtained mixture. In this case, the mixer used in extrusion-kneading is not particularly limited, and it is possible to use any appropriate mixer such as, for example, an extruder such as a single-screw extruder and a twin-screw extruder or a pressure kneader. Examples of the film-molding method include any appropriate film-molding method such as a solution cast method (a solution casting method), a melt extrusion method, a calendaring method, and a compression molding method. Among the film-molding methods, a solution cast method (a solution casting method) and a melt extrusion method are preferred.

Examples of solvents used in the solution cast method (a solution casting method) include: aromatic hydrocarbons such as benzene, toluene, and xylene; aliphatic hydrocarbons such as cyclohexane and decaline; esters such as ethyl acetate and butyl acetate; ketones such as acetone, methyl ethyl ketone, and methyl isobutyl ketone; alcohols such as methanol, ethanol, isopropanol, butanol, isobutanol, methyl cellosolve, ethyl cellosolve, and butyl cellosolve; ethers such as tetrahydrofuran and dioxane; halogenated hydrocarbons such as dichloromethane, chloroform, and carbon tetrachloride; dimethyl formamide; dimethyl sulfoxide, and the like. These solvents may be used alone or in combination of two or more thereof.

Examples of an apparatus for performing the solution cast method (a solution casting method) include a drum-type casting machine, a band-type casting machine, a spin coater and the like. Examples of the melt extrusion method include a T-die method, an inflation method, and the like. The molding temperature is preferably 150° C. to 350° C., and more preferably 200° C. to 300° C.

When a film is molded by the T-die method, a T-die is mounted on a front end portion of a publicly-known single- or twin-screw extruder, and a film extruded in a film form is wound, thereby obtaining a roll-shaped film. In this case, the film may also be uniaxially stretched by appropriately adjusting the temperature of a winding roll to stretch the film in an extrusion direction. Further, simultaneous biaxial stretching, successive biaxial stretching, and the like may also be performed by stretching the film in a direction perpendicular to an extrusion direction.

The acrylic protective film may be any one of an unstretched film or a stretched film. The acrylic film may be a uniaxially stretched film or a biaxially stretched film when the acrylic film is a stretched film, and the acrylic film may be a simultaneously biaxially stretched film or a successively biaxially stretched film when the acrylic film is the biaxially stretched film. When the acrylic film is biaxially stretched, mechanical strength of the film is improved, so that performance of the film is improved. The acrylic film is mixed with other thermoplastic resins, so that the acrylic film may suppress an increase in phase difference and maintain optical isotropy even when the acrylic film is stretched.

A stretching temperature is preferably within a range near a glass transition temperature of a thermoplastic resin composition as the film raw material, preferably (a glass transition temperature–30° C.) to (a glass transition temperature+100° C.), and more preferably (a glass transition temperature–20° C.) to (a glass transition temperature+80° C.). When the stretching temperature is less than (a glass transition temperature–30° C.), there is a concern in that a sufficient stretching magnification ratio may not be obtained. In contrast, when the stretching temperature is more than (a glass transition temperature+100° C.), there is a concern in that the flowing (flow) of the resin composition occurs, and thus, stable stretching may not be performed.

A stretching magnification ratio defined as an area ratio is preferably 1.1 to 25 times and more preferably 1.3 to 10 times. When the stretching magnification ratio is less than 1.1 times, there is a concern in that the stretching magnification ratio may not lead to an improvement in toughness, which is accompanied by stretching. When the stretching magnification ratio is more than 25 times, there is a concern in that effects obtained by increasing the stretching magnification ratio are not acknowledged.

The stretching speed is preferably 10 to 20,000%/min, and more preferably 100 to 10,000%/min in one direction. When the stretching speed is less than 10%/min, it takes a rather long time to obtain a sufficient stretching magnification ratio, so that there is a concern in that the manufacturing costs may be increased. When the stretching speed is more than 20,000%/min, there is a concern in that fracture of the stretched film and the like may be incurred.

In order to stabilize optical isotropy or mechanical properties of an acrylic protective film, the acrylic protective film may be subjected to a heat treatment (annealing) and the like after the stretching treatment. Conditions for the heat treatment are not particularly limited, and any appropriate conditions known in the art may be adopted.

Meanwhile, surface treatment may be performed on the acrylic protective film in order to improve adhesive strength, if necessary, and for example, it is possible to perform at least one surface treatment, which is selected from the group consisting of an alkali treatment, a corona treatment, and a plasma treatment, on at least one surface of the optical film.

An exemplary embodiment of the present specification provides a display device comprising: a display panel; and the above-described polarizing plate according to the exemplary embodiment, which is provided on one surface or both surfaces of the display panel.

The display panel may be a liquid crystal panel, a plasma panel, and an organic light emitting panel.

Accordingly, the display device may be a liquid crystal display (LCD), a plasma display panel (PDP), and an organic light emitting diode (OLED).

More specifically, the display device may be a liquid crystal display including a liquid crystal panel and polarizing plates each provided on both surfaces of the liquid crystal panel, and in this case, at least one of the polarizing plates may be a polarizing plate including the above-described polarizer according to an exemplary embodiment of the present specification.

That is, in a polarizing plate including a polyvinyl alcohol-based polarizer in which iodine or a dichroic dye is dyed and a protective film provided on at least one surface of the polyvinyl alcohol-based polarizer, the polarizing plate has a depolarization region of which a unit body transmittance is 80% or more locally in a wavelength band of 400 nm to 800 nm, in which the depolarization region has an arithmetic mean roughness (Ra) of 200 nm or less, a degree of polarization of 10% or less, and a sagging of 10 μm or less.

In this case, the type of liquid crystal panel included in the liquid crystal display is not particularly limited. For example, publicly-known panels, such as a passive matrix-type panel such as a twisted nematic (TN), super twisted nematic (STN), ferroelectric (F) or polymer dispersed (PD) panel; an active matrix-type panel such as a two terminal or three terminal panel; and an in-plane switching (IPS) panel and a vertical alignment (VA) panel, may be all applied without being limited in type. Furthermore, other configurations constituting the liquid crystal display device, for example, the kind of upper and lower substrates (for example, a color filter substrate or an array substrate) is not particularly limited, and a configuration publicly-known in the art may be adopted without limitation.

Mode For Invention

Hereinafter, the present invention will be described in detail with reference to specific examples.

Preparation Example 1—Acrylic Protective Film

A resin composition in which poly(N-cyclohexylmaleimide-co-methylmethacrylate), a styrene-maleic anhydride copolymer resin, and a phenoxy-based resin were uniformly mixed at a weight ratio of 100:2.5:5 was supplied to a 24Φ extruder that was substituted with nitrogen from a raw material hopper to the extruder, and melted at 250° C. to prepare a raw material pellet.

As the phenoxy-based resin, PKFE (Mw=60,000, Mn=16,000, and Tg=95° C.) manufactured by InChemRez® Co., Ltd., was used; as the styrene-maleic anhydride copolymer resin, Dylaeck 332 containing 85 wt % of styrene and 15 wt % of anhydrous maleic anhydride was used; and as the poly(N-cyclohexylmaleimide-co-methylmethacrylate) resin, a poly(N-cyclohexylmaleimide-co-methylmethacrylate) resin in which the content of N-cyclohexylmaleimide was 6.5 wt % as a result of an NMR analysis was used.

The obtained raw material pellet was dried under vacuum, melted at 260° C. by using the extruder, and passed through a coat hanger-type T-die, and then passed through a chrome-coated casting roll and a dry roll and the like to prepare a film having a thickness of 150 μm. This film was stretched at a ratio of 170% using a difference in speed between rolls in an MD direction at 125° C. by using a pilot stretching device to prepare an acrylic film.

The acrylic film prepared through the above-described process was subjected to corona treatment, and one side of the acrylic film was then coated, by using a #7 bar, with a primer composition, in which 20 parts by weight of an oxazoline crosslinking agent (WS700 manufactured by Nippon Shokubai Co., Ltd.) was added to a primer composition having 10 wt % of a solid component which was prepared by diluting CK-PUD-F (Chokwang urethane dispersion) with pure water, and then the acrylic film was stretched at 130° C. in a TD direction by 190% using a tenter to finally prepare an acrylic protective film having a primer layer thickness of 400 nm.

Preparation Example 2—Preparation of Radical Curable Adhesive Composition (1) Adhesive Composition A 3 parts by weight of phenylbis(2,4,6-trimethylbenzoyl)-phosphineoxide as a radical initiator was added to 100 parts by weight of an adhesive composition including 60 parts by weight of 2-hydroxyethylacrylate and 40 parts by weight of 1-(3-(2-(acryloyloxy)ethyl)ureido)propan-2-yl acrylate (Formula B-4), thereby preparing adhesive composition A.

(2) Adhesive Composition B 3 parts by weight of phenylbis(2,4,6-trimethylbenzoyl)-phosphineoxide as a radical initiator was added to 100 parts by weight of an adhesive composition including 60 parts by weight of 2-hydroxyethylacrylate, 30 parts by weight of 1-(3-(2-(acryloyloxy)ethyl)ureido)propan-2-yl acrylate (Formula B-4), and 10 parts by weight of 1,2,2,6,6-pentamethyl-4-piperidiyl methacrylate, thereby preparing adhesive composition B.

(3) Adhesive Composition C 3 parts by weight of phenylbis(2,4,6-trimethylbenzoyl)-phosphineoxide as a radical initiator was added to 100 parts by weight of an adhesive composition including 60 parts by weight of 2-hydroxyethylacrylate, 30 parts by weight of 1-(3-(2-(acryloyloxy)ethyl)ureido)propan-2-yl acrylate (Formula B-4), and 10 parts by weight of N,N-dimethyl acrylamide, thereby preparing adhesive composition C.

(4) Adhesive Composition D 3 parts by weight of phenylbis(2,4,6-trimethylbenzoyl)-phosphineoxide as a radical initiator was added to 100 parts by weight of an adhesive composition including 60 parts by weight of 4-hydroxybutylacrylate, 30 parts by weight of 1-(3-(2-(acryloyloxy)ethyl)ureido)propan-2-yl acrylate (Formula B-4), and 10 parts by weight of N,N-dimethyl acrylamide, thereby preparing adhesive composition D.

(5) Adhesive Composition E 3 parts by weight of phenylbis(2,4,6-trimethylbenzoyl)-phosphineoxide as a radical initiator was added to 100 parts by weight of an adhesive composition including 40 parts by weight of 2-hydroxyethylacrylate and parts by weight of 9-(((3-((1-(acryloyloxy)propan-2-yl)amino)propanoyl)oxy)methyl)-9-ethyl-2,16-dimethyl-6,12-dioxo-7,11-dioxa-3,15-diazaheptadecane-1,17-diyl diacrylate (the following Formula E), thereby preparing adhesive composition E.

(6) Adhesive Composition F 3 parts by weight of phenylbis(2,4,6-trimethylbenzoyl)-phosphineoxide as a radical initiator was added to 100 parts by weight of an adhesive composition including 40 parts by weight of 2-hydroxyethylacrylate and parts by weight of 1-(3-(2-(acryloyloxy)ethyl)ureido)propan-2-yl acrylate (Formula B-4), thereby preparing adhesive composition F.

(7) Adhesive Composition G 3 parts by weight of phenylbis(2,4,6-trimethylbenzoyl)-phosphineoxide as a radical initiator was added to 100 parts by weight of an adhesive composition including 70 parts by weight of 2-hydroxyethylacrylate and parts by weight of trimethylolpropane triacrylate (TMPTA), thereby preparing adhesive composition G.

(8) Adhesive Composition H 3 parts by weight of phenylbis(2,4,6-trimethylbenzoyl)-phosphineoxide as a radical initiator was added to 100 parts by weight of an adhesive composition including 70 parts by weight of 2-hydroxyethylacrylate and 30 parts by weight of pentaerythritol triacrylate (PETA), thereby preparing adhesive composition H.

(9) Adhesive Composition I 3 parts by weight of phenylbis(2,4,6-trimethylbenzoyl)-phosphineoxide as a radical initiator was added to 100 parts by weight of an adhesive composition including 70 parts by weight of 2-hydroxyethylacrylate and 30 parts by weight of dipentaerythritol hexaacrylate (DPHA), thereby preparing adhesive composition I.

EXAMPLE 1

Adhesive composition A was applied to a primer layer of the acrylic protective film prepared in Preparation Example 1 by using a dropper, the film was laminated on both surfaces of a polarizer (a PVA device), and conditions were set such that the thickness of a final adhesive layer was 1 μm to 2 μm, and then the film was allowed to pass through a laminator (5 m/min). And then, a UV ray of 900 mJ/cm$^2$ was irradiated on the surface, on which the acrylic protective film was laminated, by using an ultraviolet irradiation device (Fusion Lamp, D bulb) to manufacture a polarizing plate. The polarizing plate was manufactured under an environment of a temperature of 20° C. and a humidity of less than 30%.

EXAMPLE 2

A polarizing plate was manufactured in the same manner as in Example 1, except that adhesive composition B was used instead of adhesive composition A.

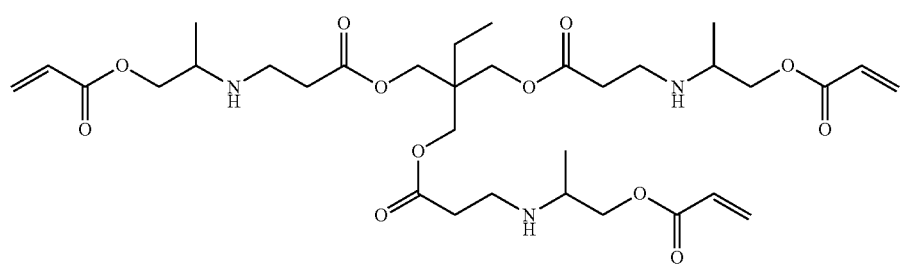

[Formula E]

EXAMPLE 3

A polarizing plate was manufactured in the same manner as in Example 1, except that adhesive composition C was used instead of adhesive composition A.

EXAMPLE 4

A polarizing plate was manufactured in the same manner as in Example 1, except that adhesive composition D was used instead of adhesive composition A.

Comparative Example 1

A polarizing plate was manufactured in the same manner as in Example 1, except that adhesive composition E was used instead of adhesive composition A.

Comparative Example 2

A polarizing plate was manufactured in the same manner as in Example 1, except that adhesive composition F was used instead of adhesive composition A.

Comparative Example 3

A polarizing plate was manufactured in the same manner as in Example 1, except that adhesive composition G was used instead of adhesive composition A.

Comparative Example 4

A polarizing plate was manufactured in the same manner as in Example 1, except that adhesive composition H was used instead of adhesive composition A.

Comparative Example 5

A polarizing plate was manufactured in the same manner as in Example 1, except that adhesive composition I was used instead of adhesive composition A.

Experimental Example

1. Measurement of Glass Transition Temperature

The glass transition temperatures of the protective layers of the polarizing plates manufactured in Examples 1 to 4 and Comparative Examples 1 to 5 were measured, and are shown in the following Table 1. Specifically, the adhesive layer of the polarizing plate manufactured under the curing conditions as described above was separated, and then the glass transition temperature value at the second run was measured by using a differential scanning calorimeter (DSC manufactured by Mettler Co., Ltd.) to increase the temperature to −30° C. to 200° C.

2. Measurement of Storage Modulus

The radical curable adhesive composition each prepared in the Preparation Examples was applied between the release PETs, conditions were set such that the final thickness was 80 μm, and then the film was allowed to pass through a laminator, and then curing was conducted under the curing conditions which was the same as in the Examples. And then, the cured product separated from the release PET was cut into a width of 5.3 mm and a length of 50 mm, and the storage modulus was measured by using DMA (manufactured by TA Instruments) to increase the temperature to −40° C. to 160° C. Among them, the results of the storage moduli at 25° C. are shown in the following Table 1.

3. Evaluation of Adhesive Strength

The polarizing plate each manufactured in Examples 1 to 4 and Comparative Examples 1 to 5 was cut into a width of 20 mm and a length of 100 mm, and then peeling strength was measured by peeling the protective film at a speed of 300 mm/min and an angle of 90° by using a texture analyzer (TA-XT Plus manufactured by Stable Micro Systems, Ltd.). The case where the peeling strength was more than 2.0 N/cm, the case where the peeling strength was 1.0 N/cm to 2.0 N/cm, and the case where the peeling strength was less than 1.0 N/cm were indicated as excellent, good, and poor, respectively. The results are shown in the following Table 1.

4. Evaluation of Thermal Shock Properties

Each of the polarizing plates manufactured in Examples 1 to 4 and Comparative Examples 1 to 5 was laminated on a glass substrate, and left to stand at −40° C. for 30 minutes, and then left to stand at 80° C. for 30 minutes, repeatedly 100 times. And then, it was evaluated with the unaided eye whether the appearance of the polarizing plate was modified. In the appearance of the polarizing plate, the case where cracks with a size of 2 mm or less were generated only on the end portion, the case where only cracks with a short line of 5 mm or more were confirmed on portions other than the end portion, and the case where a plurality of cracks was generated on the entire surface of the polarizing plate were indicated as excellent, good, and poor, respectively. The results are shown in the following Table 1.

TABLE 1

| Classification | First compound | Second compound (part by weight) | Third compound (part by weight) | Radical initiator | Tg (° C.) | Storage modulus (MPa) | Adhesive strength | Thermal shock stability |
|---|---|---|---|---|---|---|---|---|
| Example 1 | 2-HEA (60) | Formula B-4 (40) | — | Phenylbis(2,4,6-trimethylbenzoyl)-)-phosphineoxide | 75 | 2900 | Good | Excellent |
| Example 2 | 2-HEA (60) | Formula B-4 (30) | PMPMA (10) | | 80 | 3000 | Excellent | Excellent |
| Example 3 | 2-HEA (60) | Formula B-4 (30) | DMAA (10) | | 80 | 3000 | Excellent | Excellent |
| Example 4 | 4-HBA (60) | Formula B-4 (30) | DMAA (10) | | 60 | 1500 | Excellent | Good |
| Comparative Example 1 | 2-HEA (40) | Formula E (60) | — | | 85 | 3000 | Poor | Excellent |
| Comparative Example 2 | 2-HEA (40) | Formula B-4 (60) | — | | 95 | 3500 | Poor | Excellent |
| Comparative Example 3 | 2-HEA (75) | TMPTA (25) | — | | 62 | 2700 | Poor | Good |
| Comparative Example 4 | 2-HEA (75) | PETA (25) | — | | 60 | 2400 | Poor | Good |
| Comparative Example 5 | 2-HEA (75) | DPHA (25) | — | | 58 | 2300 | Poor | Good |

2-HEA: 2-hydroxyethylacrylate

4-HBA: 4-hydroxybutylacrylate

Formula E: 9-(((3-((1-(acryloyloxy)propan-2-yl)amino)propanoyl)oxy)methyl)-9-ethyl-2,16-dimethyl-6,12-dioxo-7,11-dioxa-3,15-diazaheptadecane-1,17-diyl diacrylate Formula B-4: 1-(3-(2-(acryloyloxy)ethyl)ureido)propan-2-yl acrylate TMPTA: Trimethylolpropane triacrylate PETA: Pentaerythritol triacrylate DPHA: Dipentaerythritol hexaacrylate PMPMA: 1,2,2,6,6-pentamethyl-4-piperidiyl methacrylate DMAA: N,N-dimethyl acrylamide In Table 1, it can be seen that Examples 1 to 4, which are an adhesive layer of the polarizing plate according to an exemplary embodiment of the present specification, have high glass transition temperatures, excellent storage moduli, and excellent adhesive strength and/or thermal shock stability as compared to the adhesive layers of Comparative Examples 1 to 5.

Even though the exemplary embodiments of the present invention have been described in detail, the right scope of the present invention is not limited thereto, and it will be obvious to a person with ordinary skill in the art that various modifications and alterations are possible without departing from the technical spirit of the present invention described in the claims.

The invention claimed is:

1. A polarizing plate comprising:
a polarizer;
an adhesive layer formed on at least one surface of the polarizer; and
a protective film formed on the adhesive layer,
wherein the adhesive layer is a cured product of a radical curable adhesive composition comprising:
(A) a first compound represented by the following Formula 1;
(B) a second compound represented by the following Formula B; and
(C) a radical initiator:

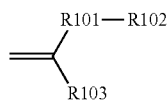

[Formula 1]

in Formula 1,
R101 is an ester group; or an ether group,
R102 is a $C_1$ to $C_{10}$ alkyl group having at least one hydroxy group (—OH); or a $C_4$ to $C_{10}$ cycloalkyl group having at least one hydroxy group (—OH),
R103 is hydrogen; or a $C_1$ to $C_{10}$ alkyl group,

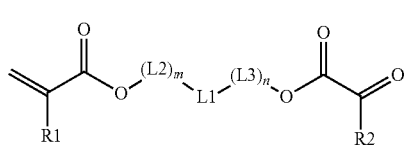

[Formula B]

in Formula B,
at least one of R1 and R2 is hydrogen, and the other is a $C_1$ to $C_{10}$ alkyl group, L1 is —N(H)C(=O)N(H)—; or —N(H)C(=O)-L4-C(=O)N(H)—, L2 to L4 are the same as or different from each other, and are each independently a $C_1$ to $C_{10}$ alkylene group, which is unsubstituted or substituted with an alkyl group, when L2 and L3 are the same as or different from each other, and are each independently an unsubstituted $C_1$ to $C_{10}$ alkylene group, one of R1 and R2 is a $C_1$ to $C_{10}$ alkyl group, m and n are each 1 or 2, and when m and n are each 2, two structures in the parenthesis are the same as or different from each other.

2. The polarizing plate of claim 1, wherein the first compound is represented by any one of the following Formula 2 to Formula 9:

[Formula 2]

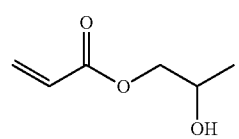

[Formula 3]

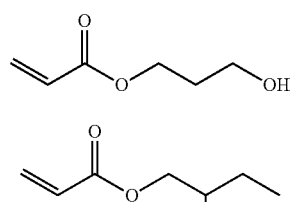

[Formula 4]

[Formula 5]

[Formula 6]

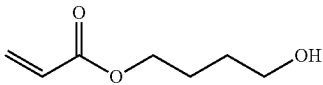

[Formula 7]

[Formula 8]

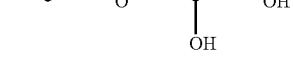

[Formula 9]

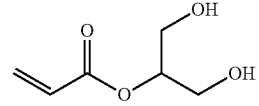

3. The polarizing plate of claim 1, wherein the second compound is obtained by reacting an aziridine compound; and (meth)acrylic acid or a (meth)acrylate including a hydroxy group (—OH) as a substituent.

4. The polarizing plate of claim 3, wherein the aziridine compound is represented by the following Formula 10 or 11:

[Formula 10]

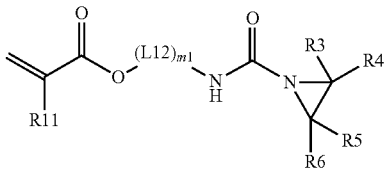

[Formula 11]

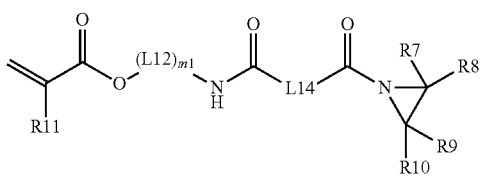

in Formulae 10 and 11,

R3 to R11 are the same as or different from each other, and are each independently hydrogen; or a $C_1$ to $C_{10}$ alkyl group, L12 and L14 are the same as or different from each other, and are each independently a $C_1$ to $C_{10}$ alkylene group, which is unsubstituted or substituted with an alkyl group, m1 is 1 or 2, and when m1 is 2, two L12s are the same as or different from each other.

5. The polarizing plate of claim 3, wherein the (meth) acrylate comprising a hydroxy group as a substituent is represented by the following Formula 12:

[Formula 12]

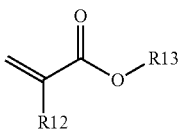

in Formula 12,

R12 is hydrogen; or a $C_1$ to $C_{10}$ alkyl group, and

R13 is a $C_1$ to $C_{10}$ alkyl group, which is substituted with at least one hydroxy group (—OH); or a $C_3$ to $C_{10}$ cycloalkyl group, which is substituted with at least one hydroxy group (—OH).

6. The polarizing plate of claim 1, wherein the second compound is represented by the following Formula B-1 or B-2:

[Formula B-1]

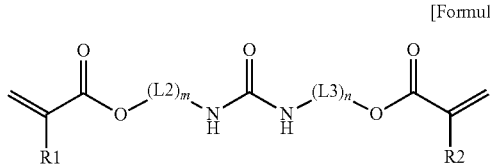

[Formula B-2]

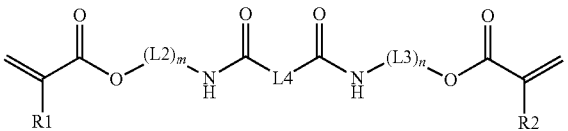

in Formulae B-1 and B-2, the definitions of R1, R2, L2 to L4, m, and n are the same as those of Formula 1.

7. The polarizing plate of claim 1, wherein the second compound is represented by any one of the following Formulae B-3 to B-5:

[Formula B-3]

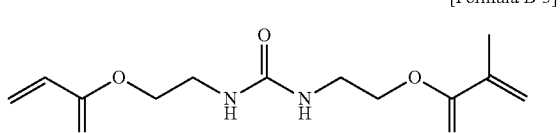

[Formula B-4]

[Formula B-5]

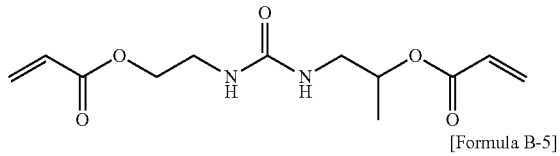

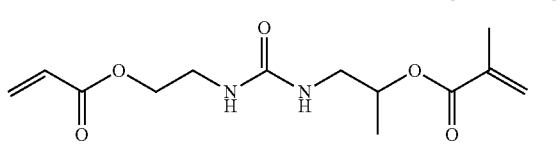

8. The polarizing plate of claim 1, wherein the radical curable adhesive composition includes
40 to 85 parts by weight of the first compound,
5 to 50 parts by weight of the second compound, and
0.1 to 10 parts by weight of the radical initiator, based on 100 parts by weight of the radical curable adhesive composition.

9. The polarizing plate of claim 3, wherein when the number of aziridine groups of the aziridine compound is defined as n, a molar ratio of the aziridine compound:(meth) acrylic acid or the (meth)acrylate comprising a hydroxy group as a substituent is 1:n, and n is an integer.

10. The polarizing plate of claim 1, wherein the radical curable adhesive composition further comprises an acrylic monomer comprising an amine group as a third compound.

11. The polarizing plate of claim 10, wherein the third compound is one or more selected from the group consisting of N,N-dimethyl acrylamide, acryloyl morpholine, N-isopropyl acrylamide, N,N-diethyl acrylamide, N,N-dimethylamino propylacrylamide, and 1,2,2,6,6-pentamethyl-4-piperidiyl methacrylate.

12. The polarizing plate of claim 10, wherein a content of the third compound is 5 to 20 parts by weight based on 100 parts by weight of the radical curable adhesive composition.

13. The polarizing plate of claim 1, wherein the radical curable adhesive composition has a glass transition temperature of 60° C. or more after UV curing.

14. The polarizing plate of claim 1, wherein the radical curable adhesive composition has a storage modulus of 1,000 MPa to 5,000 MPa, which is measured by a dynamic mechanical analysis (DMA) method at 25° C. after curing.

15. A display device comprising:
a display panel; and
the polarizing plate of claim 1, which is provided on one surface or both surfaces of the display panel.

* * * * *